United States Patent Office 3,485,516
Patented Dec. 23, 1969

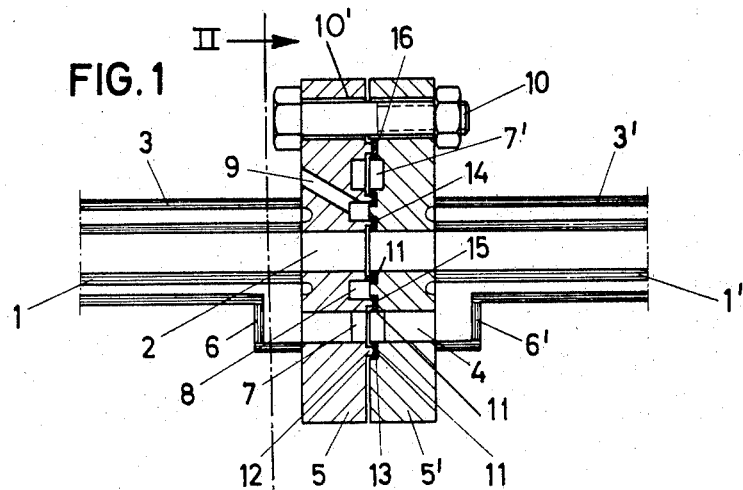
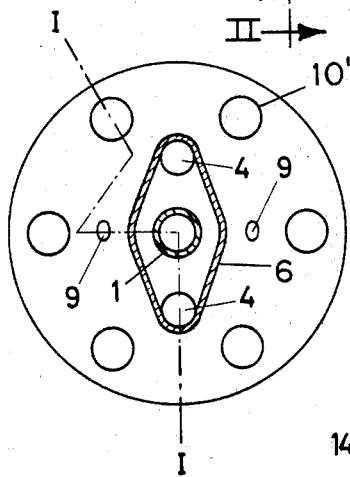
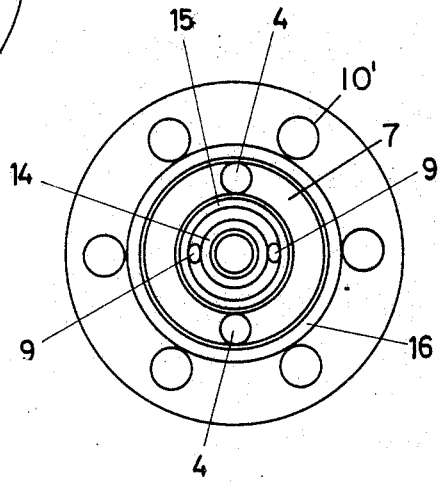

3,485,516
DOUBLE-PIPE LINE FLANGE CONNECTION
Willi Keller, Offenbach am Main, Heinrich Davin, Dornigheim (Main), and Hans Kell, Frankfurt am Main, Germany, assignors to Vickers-Zimmer Aktiengesellschaft, Planung und Bau von Industrieanlagen
Filed Sept. 15, 1967, Ser. No. 668,105
Claims priority, application Germany, Sept. 16, 1966, V 31,952
Int. Cl. F16l 39/00, 9/18
U.S. Cl. 285—14                             4 Claims

ABSTRACT OF THE DISCLOSURE

The specification discloses a connection assembly, particularly a flange-type for double-pipe lines wherein the same or different media passes through concentric pipes in the same or different directions at the same or different temperatures or pressures. A central and a secondary passage parallel thereto are provided in flanges having an annular groove intersecting the secondary passage. Regardless of the respective rotational angular orientation of the secondary passages of the respective flanges, a continuous passage is provided by means of such groove. Additionally, grooves containing sealing material in one flange and mating shoulders in the other are provided. A special leak detecting groove and passage to the exterior may be provided.

FIELD AND BACKGROUND OF THE INVENTION

The invention relates to a flange connection for pipes and the like, and particularly for double-pipe lines.

Double tubes are often used in the chemical industry, in particular for transmission of heat. These double tubes consist essentially of a central tube for a first medium and a jacket shell concentrically surrounding the central tube for the second medium. As a rule, the two media are different media, in most cases the media are under pressure and are led through the tubes flowing in the same or in opposite directions. The problem of connecting such tubes to one another, or with the respective connecting sockets of pumps, containers or the like, is not as yet solved in a completely satisfactory manner. It is known to make such connections by the use of flanges with two unequal eccentric passages with egg-shaped bolt circles, lying side by side. However, the mounting of such flange connections or joints is expensive and the connection places often leak.

OBJECTS

It is among the objects of this invention to provide a flange connection, in particular for double-tube lines, which flange connection is extremely simple with regard to its construction, permits a quick, reliable mounting, and guarantees an extremely good sealing. Other objects will appear from the description which follows.

SUMMARY

According to the invention, the problem is solved by having a central passage for the first pipe line, at least one further secondary passage for the second pipe line set up parallel to the central passage and a ventilated ring-shaped space, bordering the central passage in the range of the surfaces of the connection resting against one another, in which case seals are respectively set up around the central passage, the ventilated space and the parallel secondary passage.

For particularly good results, the seals are disposed coaxially in relation to one another and are essentially produced by grooves having sealing inserts and mating shoulders. In such an embodiment, even when using media heated to a high temperature and being under high pressure a reliable exterior sealing, as well as between the media, is attained.

The secondary passage or passages can, in the area of the surfaces of the connection facing against one another, open out into an annular slot in which case the annular slot or groove of each communicates with that of the other. By means of this annular slot, and because of the concentrically arranged sealings and screws, a mounting position of the flanges which are rotatable around the hole almost at random (in increments of the bolt division angle) can be obtained without thereby impairing the sealing effect.

DETAILED DESCRIPTION

By reference to the example shown in the drawings, the invention is explained in more detail. There are shown in:
FIGURE 1 a section through a flange connection according to line I—I of FIGURE 2;
FIGURE 2 a view of the flange connection, partly in section, along the line II—II of FIGURE 1; and
FIGURE 3 a plan view onto a sealing surface of the flange connection.

FIGURE 1 shows a sectional view of a flange connection of two double tubes having the same diameters. In this flange connection, the medium flowing within the inner tubes 1, 1' can pass through the flange connection without obstacle. The central passage 2 of the flange connection for the inner tubes 1, 1' has the same diameter as the inner tubes 1, 1'. The connection of the outer tubes 3, 3' is, as also evident from FIGURES 2 and 3, produced by two secondary passages 4 disposed symmetrically in relation to one another. These secondary passages 4 are disposed axially parallel to the central passage 2. In this embodiment, the outer tubes 3, 3' are, at their connection places at the flange parts 5, 5', provided with enlarged shoulders 6, 6' so that the liquid can pass into the secondary passage 4. In the range of the surfaces of the connection resting against one another, the secondary passages 4 are connected to annular slots or grooves 7, 7'. These annular slots are provided in both flange parts 5, 5' so that communication between the secondary passages 4 can take place, and twisting or rotational offsetting of the flange portions 5, 5' relative to one another during mounting cannot block the secondary passages.

Additionally, in the area of the surfaces of the connections in contact with one another, a ring-shaped space 8 is provided around the central passage 2. In this embodiment, the space 8 is formed by an annular slot or groove provided in part 5 of the flange connection. The slot 8 is furthermore open to the atmosphere by two bores 9. Connecting the two flange parts 5, 5' to one another is accomplished simply by positioning the flange 5, 5' against each other and securing bolts 10 set in a circular array in bolt hole 10' in the flange parts 5, 5'.

The individual passages 2 and 4, as well as the annular space 8, are sealed to prevent leakage between one another. In the case of the embodiment shown, the sealing is attained by means of grooves 11 in flange 5' to receive shoulder 12 with sealing material inserts 13. A first annular sealing ring 14 encircles the central passage 2, a second sealing ring 15 is disposed coaxial to the central passage 2 and encircles the annular ventilated space 8, and finally a third sealing ring 16 seals the secondary passages 4 towards the outside. This arrangement of sealing rings 14, 15, and 16 guarantees a high safety. For example, in case that the first sealing 14 or the second sealing 15 becomes leaky, no mixing of the two heat-exchanging media can take place. One of the media will pass into the ventilated space through the one sealing which has become leaky, and from that space it will pass through bore 9 to the outside. There the leak condition can be determined and corrected at once.

In FIGURE 2, the symmetrical arrangement of the secondary passages 4 is well distinguishable. From FIGURE 3, the concentric arrangement of sealing rings 14, 15, and 16 can be recognized. This concentric position of all sealing rings 14, 15, and 16 and bolts 10 around the central point of the flange is especially favorable for the uniform adaptation of the sealing surfaces to each other. Because of this, an optimum sealing effect can be attained. A still better seal can be provided by bringing the bolt hole's 10' center-facing edge close to the outer sealing ring 16.

In a still further embodiment, excellent sealing of the flange connection is also attained where more than two secondary passages are provided, each one of which passages is sealed by a separate sealing ring. Although only two secondary passages 4 are shown between sealing rings 15 and 16 in FIGURE 3, a plurality may be provided, lying within the groove 7. While a pipe-to-pipe coupling is illustrated, pipe-to-vessel or vessel-to-vessel couplings and the like are contemplated within the scope of the invention.

Other embodiments and equivalents may be provided without departing from the scope and spirit of our invention.

We claim:
1. A flange connection assembly comprising:
 (a) means defining a first plate,
 (b) means defining a second plate, said plates each having:
  (i) an axial bore therethrough,
  (ii) an axially parallel second bore therethrough,
  (iii) mating surfaces, and
  (iv) an annular first groove on said mating surfaces of each of said plates disposed concentric to said axial bore and intersecting said second bore,
 (c) means for sealing said bores from each other and from the exterior edge of said plate disposed between said plates and disposed to permit flow of fluid through said bores, said means including:
  (i) an annular second groove in said second plate means concentric to said axial bore and disposed between said axial bore and said annular first groove intersecting said second bore,
  (ii) a passage disposed in said second plate means communicating between said annular second groove and the opposite side of said second plate means,
  (iii) a first relatively shallow annular groove in one of said plate means disposed concentrically between said axial bore and said annular second groove,
  (iv) a second relatively shallow annular groove in one of said plate means disposed concentrically between said annular second groove and said annular first groove,
  (v) a third relatively shallow annular groove in one of said plate means disposed concentric with and exterior of said annular first groove,
  (vi) concentric shoulders disposed in the other of said plate means adapted to mate with said relatively shallow grooves of said one plate means, and
  (vii) sealing material disposed in said relatively shallow grooves of said one plate means,
 (d) means for securing said first and second plate means together,
 (e) first means for retaining a fluid communicating with said axial bore of each of said plate means secured thereto respectively, and
 (f) second means for retaining a fluid communicating with said second bore of each of said plate means disposed exteriorly and concentric to said first communicating means secured to said plate means respectively.
2. A flange connection as in claim 1 wherein a plurality of axially parallel second bores are disposed in each of said plates.
3. A flange connection as in claim 2 wherein:
said first and second communicating means are pipes, and said plate means are flanges.
4. A flange connection as in claim 2 wherein:
said communication means secured to said first plate are pipes,
said first plate means is a flange, and
said second plate means is part of a vessel.

References Cited

UNITED STATES PATENTS

| 1,097,263 | 5/1914 | Reich | 285—137 X |
| 1,349,663 | 8/1920 | Cumfer | 285—133 |
| 1,497,652 | 6/1924 | Browne | 285—93 X |
| 2,645,527 | 7/1953 | Walters | 285—133 X |
| 3,214,202 | 10/1965 | Maychark | 285—331 X |

FOREIGN PATENTS

| 1,165,716 | 6/1958 | France. |
| 790,262 | 2/1958 | Great Britain. |

THOMAS F. CALLAGHAM, Primary Examiner

U.S. Cl. X.R.

285—137, 331